Jan. 14, 1941.  E. MILLER  2,228,774
TIRE-BUILDING APPARATUS
Filed Oct. 25, 1938  4 Sheets-Sheet 1

INVENTOR.
Edwin Miller,
BY Archworth Martin,
ATTORNEY.

Jan. 14, 1941.　　　　E. MILLER　　　　2,228,774
TIRE-BUILDING APPARATUS
Filed Oct. 25, 1938　　　　4 Sheets-Sheet 2

INVENTOR.
Edwin Miller,
BY Archworth Martin,
ATTORNEY.

Jan. 14, 1941.  E. MILLER  2,228,774
TIRE-BUILDING APPARATUS
Filed Oct. 25, 1938  4 Sheets-Sheet 4
Fig. 4.
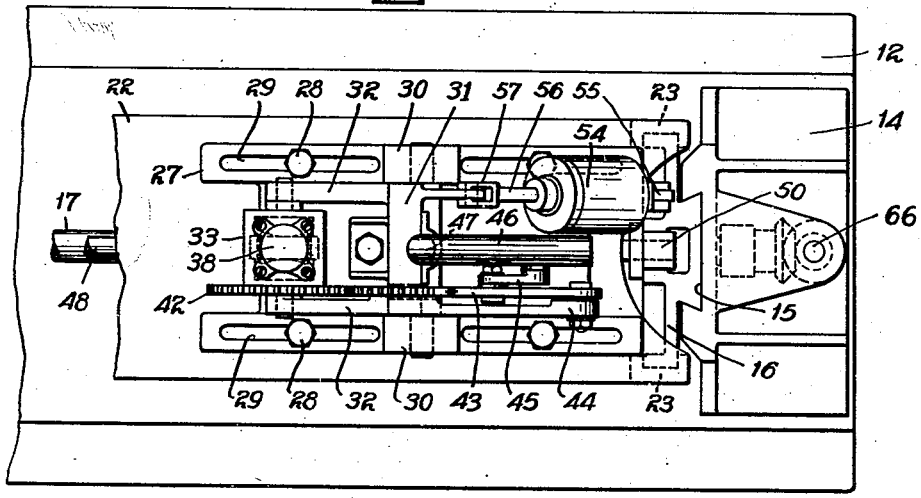
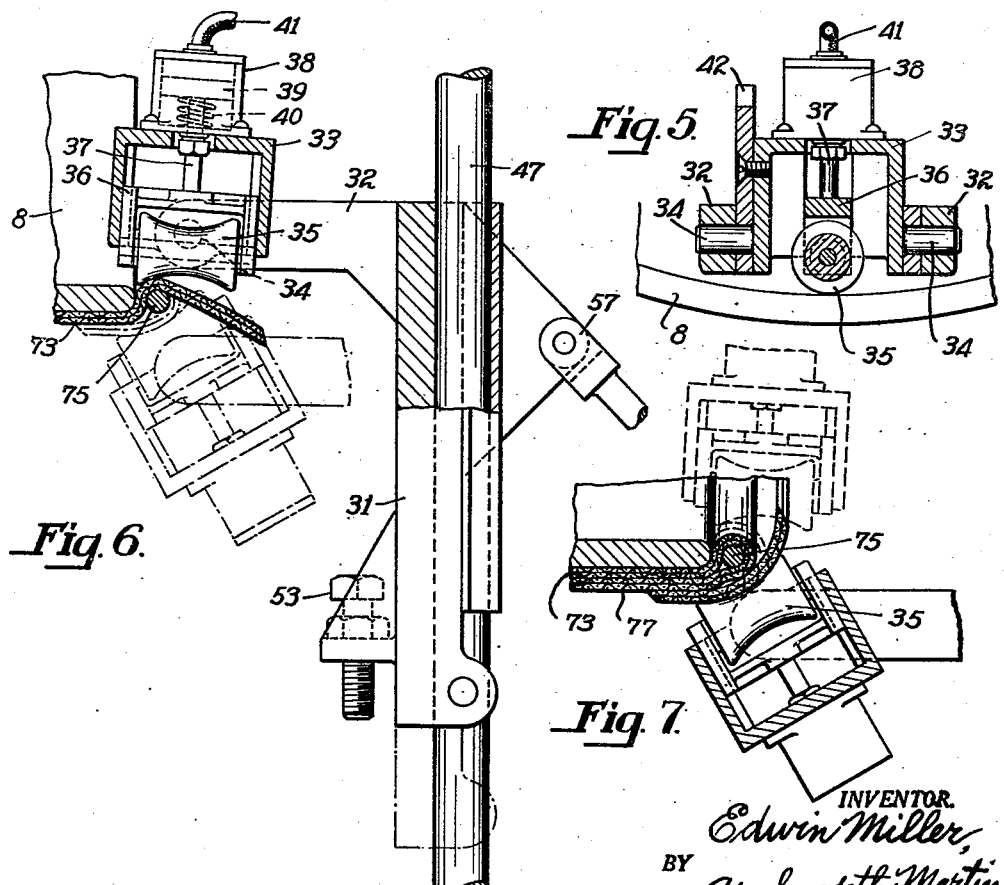
INVENTOR.
Edwin Miller,
BY Archworth Martin
ATTORNEY Patented Jan. 14, 1941

2,228,774

UNITED STATES PATENT OFFICE 2,228,774

TIRE-BUILDING APPARATUS

Edwin Miller, Jeannette, Pa.

Application October 25, 1938, Serial No. 236,900

13 Claims. (Cl. 154—10)

My invention relate to tire-building apparatus, and more particularly to apparatus for folding the bead margins of the plies of tire fabric about the bead cores and stitching them into place.

The invention is particularly applicable to that method of tire building which involves the use of a rotatable drum upon which the plies of tire fabric are placed, for the purpose of pressing or folding the fabric around the tire beads and applying the rubber tread.

One object of my invention is to provide in apparatus of the character referred to a tool or device with operating mechanism therefor whereby the edge portions of the tire fabric can be folded smoothly about the bead cores and stitched into place by a single tool.

Another object of my invention is to provide mechanism of the type referred to, which can readily be employed with tire drums of different widths and diameters.

Figure 1:
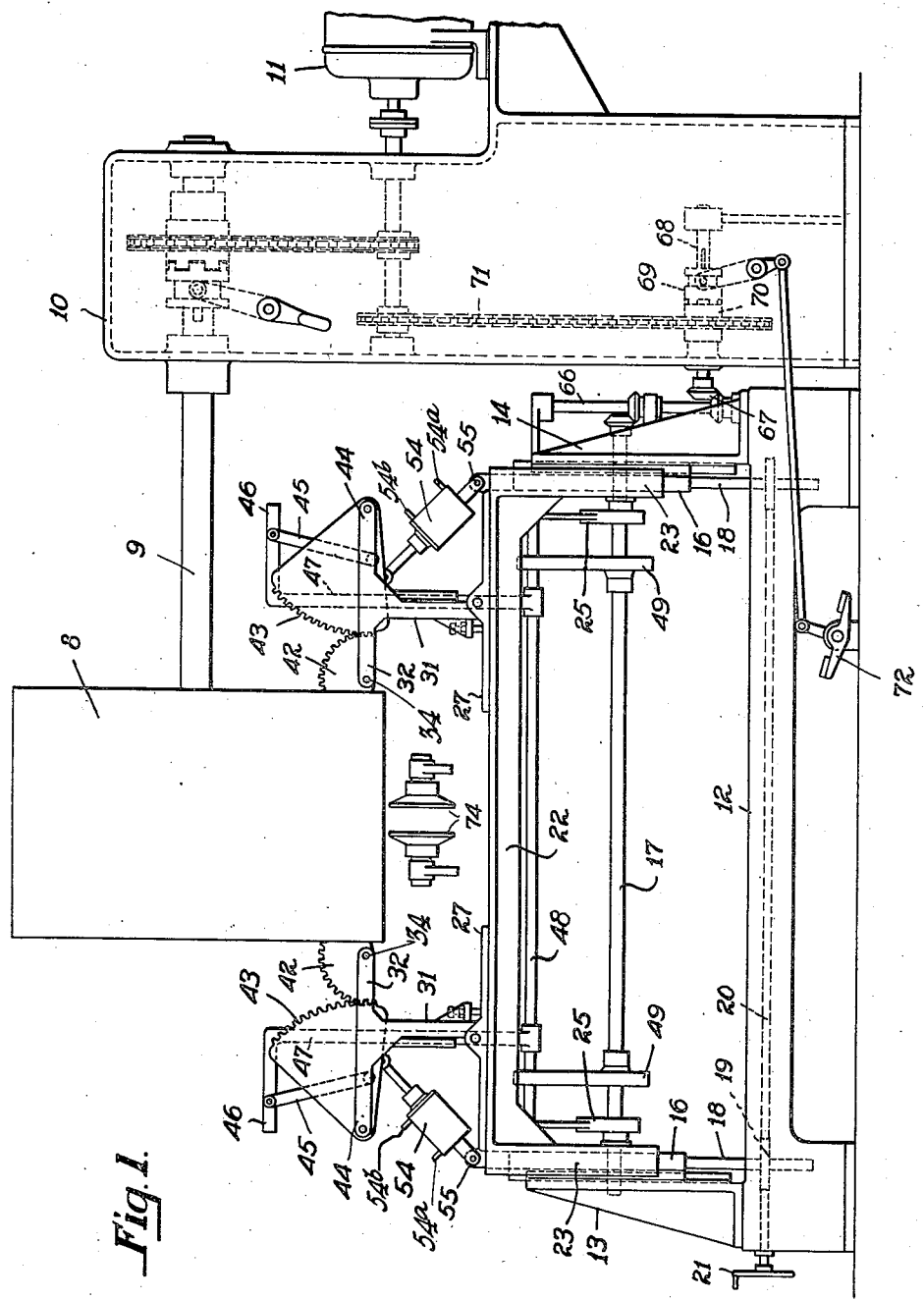
Figure 2:
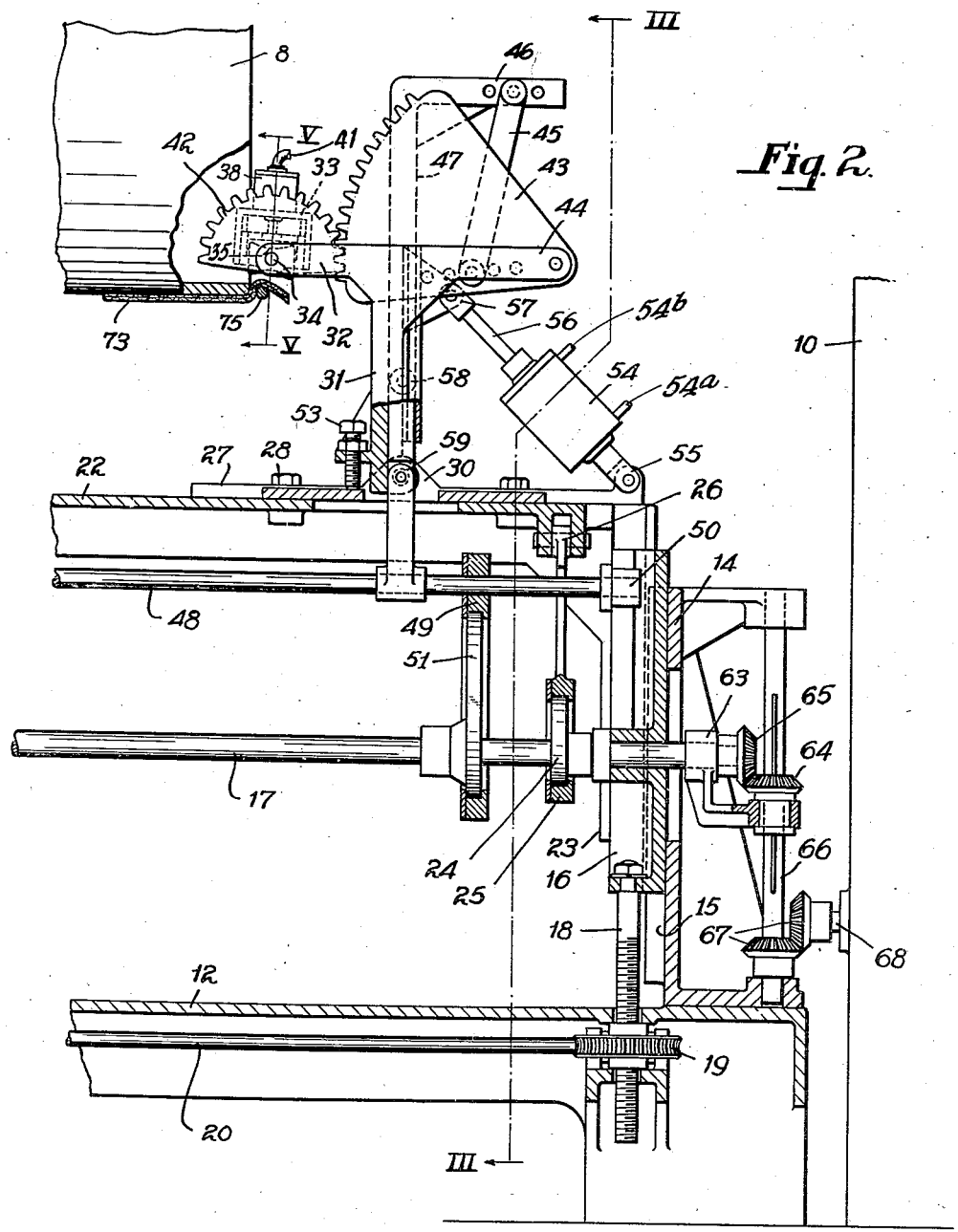
Figure 3:
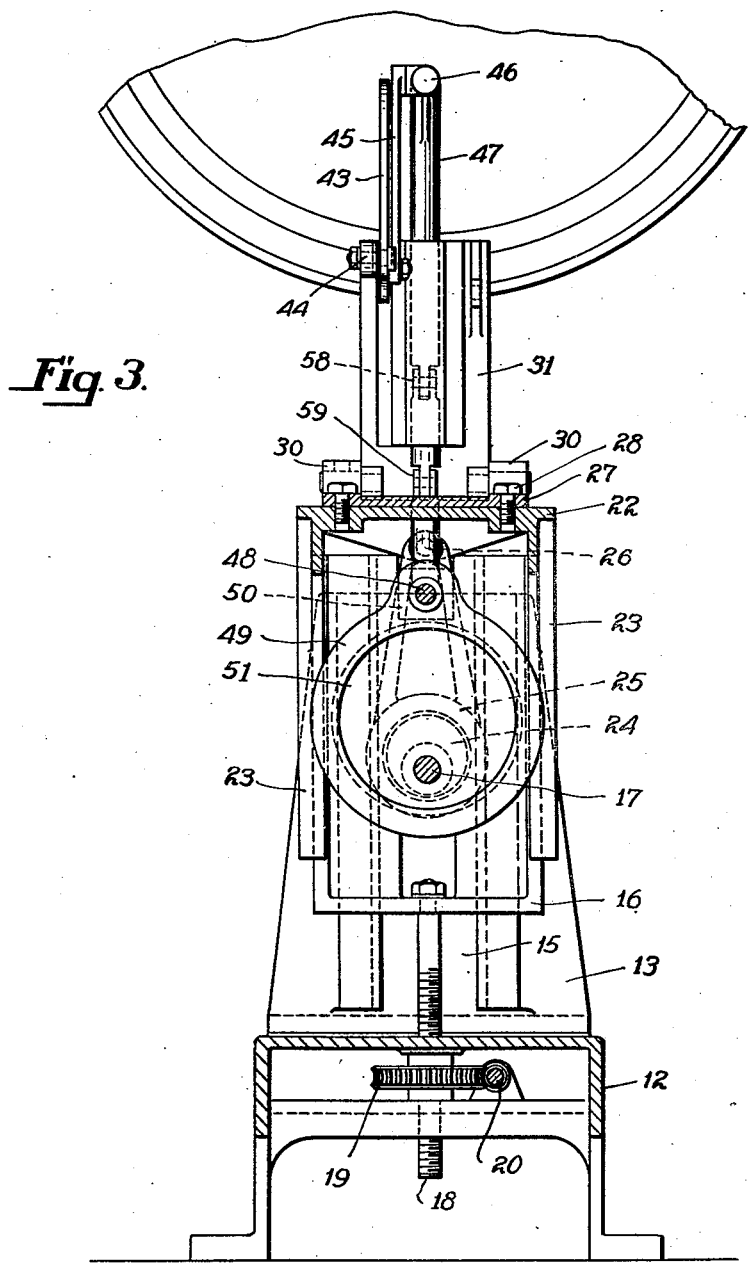

As shown in the accompanying drawings, Figure 1 is a face view of the machine; Fig. 2 is a vertical sectional view on an enlarged scale, of the mechanism which operates at one side of the tire drum; Fig. 3 is a view taken on the line III—III of Fig. 2; Fig. 4 is a plan view of the apparatus of Fig. 2; Fig. 5 is an enlarged view taken on the line V—V of Fig. 2; Fig. 6 is an enlarged view of a portion of the apparatus of Fig. 2, showing certain of the parts at one stage of operation, and Fig. 7 is a similar view, but showing such parts at an intermediate position when moving from the face of the drum toward the side thereof.

The apparatus is shown as employed in connection with a tire building drum or form 8 which is rotated during the operation of placing the fabric plies and the rubber tread thereon, the drum being of the usual collapsible type and well known in the art. The drum is mounted upon a shaft 9 which is supported by a housing 10 and is driven through conventional driving mechanism from a motor 11.

A base 12 is provided with upstanding guide brackets 13 and 14 that have slideways 15 formed therein for the reception of bearing slides 16 in which is journalled a cam shaft 17. The bearing slides 16 are supported on screws 18 that have threaded engagement with worm wheels 19 which are journalled in the base 12. A worm shaft 20 is also journalled in the base and is provided with a hand wheel 21 whereby the bearing slides 16 may be vertically adjusted to accommodate the apparatus to tire drums of various diameters.

A base plate 22 at its ends has downwardly projecting legs 23 which are vertically slidable on the bearing slides 16. A pair of cams or eccentric discs 24 are secured to the shaft 17 and cooperate with cam followers or eccentric rings 25 that are connected at 26 to the underside of the plate 22, so that as the shaft 17 rotates, the plate 22 and the parts carried thereby will be raised and lowered. Bead-forming mechanisms or units for folding and stitching the plies of fabric on the drum 8 are carried by the base plate 22, one of these bead-forming units being provided for each side of the tire. The units are of similar construction and description of one will suffice for both.

Each unit comprises a plate 27 that is positioned upon the plate 22 and is adjustable thereon in directions parallel to the shaft 17, by means of bolts 28 that extend through elongated slots 29 in the plate 22. The plate 27 is provided with a pair of bosses 30 to which is pivotally connected an upstanding bracket 31, so that the bracket can be swung toward and from the tire drum as will be hereinafter explained. The bracket 31 has a pair of laterally-extending arms 32 between which is positioned a roller casing 33 which is provided with trunnions 34, so that it can have oscillatory movement on the arms (as shown more clearly in Figs. 4 and 5).

A peripherally-grooved roller 35 is journalled in a yoke 36 which is positioned within the casing 33 and is slidable therein. The yoke 36 is connected to a piston rod 37 that extends into a cylinder 38 and carries a piston 39. A spring 40 normally exerts pressure against the piston 39 to hold the casing 36 and the roller in retracted position within the casing 33. A flexible fluid-pressure supply pipe 41 is provided for admitting pressure behind the piston to move the roller to projected position as shown in Fig. 6.

A segmental gear element 42 is secured to the casing 33 and meshes with a driving gear segment 43 that is pivotally connected to an extension 44 of the bracket 31. The gear segment 43 is oscillated by a link 45 which is connected to a lateral extension 46 of a vertical rod 47. A bar 48 extends through the lower end of the rod 47 of each bead-forming unit and through a pair of eccentric rings 49. The ends of the bar 48 carry guide blocks 50 that fit within vertical guideways in the bearing slides 16. A pair of cams or eccentric discs 51 are connected with the shaft 17 and cooperate with cam followers or eccentric rings 49, so that during rotation of the shaft 17, the bar 48 will be raised and lowered to actuate each of the rods 47 and effect oscillation of the gear segments 43 and 42, and thereby rock the roller and its casing on the trunnions 34.

The bracket 31 is yieldably maintained in an upright position by fluid pressure admitted to the under side of a piston within a cylinder 54 having inlet and outlet pipes 54a and 55b, as shown more clearly in Fig. 2. An adjustable stop screw 53 serves to limit inward tilting of the bracket. The cylinder 54 is pivotally connected at 55 to the plate 27, and a piston rod 56 is pivotally connected at 57 to the bracket 31. When it is desired to swing the bracket backwardly to inoperative position with respect to the tire drum 8, fluid pressure is admitted to the upper side of the piston within the cylinder 54 while the pressure below the piston is exhausted.

The rod 47 is composed of sections which are joined at 58 and 59, so that when the rod is in its raised position, it will flex at 59 to permit outward swinging of the bracket 31, and when the rod is in its lower position it will flex at 58 to permit outward swinging of the bracket 31. In order to vary the range of arcuate movement of the roller about the trunnions 34, the link 45 is adjustably connected at its ends to the arm 46 and the gear segment 43, it being understood that as the lower end of the arm is adjusted toward the axis of the gear segment 43, the amplitude of oscillation will be increased.

As above explained, the vertical adjustment of the bearing slides 16 will accommodate the apparatus to tire drums of various diameters. Driving connections to the shaft 17 throughout such range of adjustments is maintained by an L-shaped bracket 63 that is carried by the shaft 17, and whose horizontal arm vertically supports a bevel gear wheel 64 which meshes with a gear wheel 65 carried by the shaft 17. The gear wheel 64 is slidably keyed to an upright shaft 66 that is journalled in the bracket 14. The shaft 66 is driven through bevel gear wheels 67, by a shaft 68 that has clutch connection at 69 with a sprocket wheel 70, which through a chain driving connection at 71 is driven from the motor 11. The operator will actuate the clutch 69 through movement of a foot treadle 72.

In the operation of the apparatus, the rollers and the supporting brackets 31 will be swung away from the drum 8, through the admission of fluid pressure to the upper ends of the cylinders 54. Plies of fabric 73 will then be placed upon the drum and "stitched" by stitchers 74 that may be operated in various ways well known in the prior art, the edges of the fabric being pushed slightly alongside the drum to permit placing of the beads 75. Thereupon the pressure is relieved from the upper ends of the cylinders 54 and fluid pressure admitted to the lower ends of the cylinders 54, thereby moving the brackets and the stitching rollers to operative position as shown more clearly in Figs. 2 and 6. Fluid pressure is then admitted to the outer ends of the cylinders 38 to push the rollers 35 against the fabric, as shown in full lines in Fig. 6, and into pressing engagement with the plies of fabric at the inner peripheries of the beads 75. At this time the drum 8 will be rotating. The clutch 69 is then operated to start rotation of the shaft 17, with the result that the cams 51 and 24 will be rotated to move the base plate 22 downwardly and to draw down the pull rods 47. The downward movement of each pull rod 47 results in rocking the roller casing 33 and the roller 35 on the trunnions 34, while the plate 22 is simultaneously lowered to thereby bodily shift the trunnions 34 radially of the tire drum, so that the roller will be moved from the position shown by full lines in Fig. 6 to the position shown in broken lines, thus folding the projecting edges of the fabric plies around the bead 75, the roller serving also to stitch such plies against the fabric on the peripheral face of the drum. The pressure between the roller and the fabric being folded is yieldably maintained by the fluid pressure within the cylinders 38 and 54.

At the completion of this folding and stitching operation, the operator will move the clutch 69 to declutched position. Thereupon he will release the pressure in the upper end of the cylinders 38 allowing the spring 40 to retract the roller within its casing and so that the roller will be moved clear of the bead, and he will then admit pressure to the upper end of the cylinders 54 to swing the brackets 31 away from the drums. The fabric plies 77 will then be placed on the drum and stitched into place by the stitchers 74, whereupon the pressure within the cylinders 54 is reversed to return the brackets 31 to upright position and pressure is admitted to the upper ends of the cylinders 38 to move the roller from the full line position of Fig. 7 to the broken line position, thus folding the superposed plies 77 upwardly around the bead. The roller is thus bodily moved through an arcuate path to effect a raising or folding of the plies around the bead, and is simultaneously rotated on its axis by reason of its engagement with the fabric to perform a stitching operation. A rubber tread (not shown) may be placed upon the plies 77 either before or after the final folding and stitching operation by the rollers 35. The movement of the folding and stitching rollers as described, is slow relative to the rate of rotation of the drum, so that the drum will make a considerable number of revolutions during each cycle of folding and stitching movement by the rollers, and the fabric is thus gradually folded about the bead core with a minimum danger of wrinkling or creasing, and is simultaneously stitched in place.

At the completion of upward movement of the parts just described, the rollers 35 will be retracted and the brackets 31 swung outwardly as described, to permit removal of the tire carcass from the drum.

I claim as my invention:

1. Tire-building apparatus comprising a rotatably-supported tire-building drum for receiving the fabric plies of a tire, with the edges of the fabric projecting axially beyond the sides of the drum, in position to receive bead cores of annular shape that are disposed peripherally of the fabric, a roller positioned adjacent to each side of the said drum, with its axis normally extending in the same general direction as the axis of the drum, means for moving the roller into position to press the projecting fabric in a radially-outward direction against the bead core, and means for continuously tilting the roller about an axis transverse to the axis of the drum, while it is maintained in said pressing engagement with the fabric, through an arcuate path that extends from the side of the drum to the periphery thereof.

2. Tire-building apparatus comprising a rotatably-supported tire-building drum for receiving the fabric plies of a tire, with the edges of the fabric projecting axially beyond the sides of the drum, in position to receive bead cores of annular shape that are disposed peripherally of the fabric, a roller positioned adjacent to each side of the said drum, with its axis normally extending in the same general direction as the axis of the drum, means for moving the roller into position to press the projecting fabric in a radially-outward direction against the bead core, and means for continuously tilting the roller about an axis transverse to the axis of the drum and for shifting it radially of the drum, while it is maintained in said pressing engagement with the fabric, in each direction through an arcuate path that extends from the side of the drum to the periphery thereof.

3. Tire-building apparatus comprising a rotatably-supported tire-building drum for receiving the fabric plies of a tire, with the edges of the fabric projecting axially beyond the sides of the drum, in position to receive bead cores of annular shape that are disposed peripherally of the fabric, a tool engageable with projecting edges of the fabric, in position to press the fabric against the inner peripheries of the bead cores in a radially outward direction, a supporting member for the tool, and means for shifting said member and the tool in directions radially of the drum, and for simultaneously tilting the tool about an axis transverse to the line of said shifting movement while maintaining it in pressing engagement with the fabric.

4. The combination with a rotatably-mounted tire-building drum for receiving fabric plies of a tire, of a tool for wrapping the edges of the fabric around bead cores, a movable base, a bracket on said base, means for pivotatlly supporting the tool on the bracket, on an axis transverse to the axis of the drum, a rotatable shaft, a cam carried by the shaft, a cam follower cooperating with the said cam and having engagement with said base, arranged to effect movements of the base radially of the drum during rotation of the shaft, a second cam on the shaft, a cam follower therefor, and means actuated by said follower for tilting the tool on its bracket, about an axis transverse to the axis of the drum.

5. The combination with a rotatably-mounted tire-building drum for receiving fabric plies of a tire, of bead-wrapping mechanism comprising a peripherally-grooved roller whose axis normally extends in the same general direction as the axis of the drum, a movable base, a bracket mounted on the base, a bearing bracket tiltably mounted on the first-named bracket, for supporting the said tool, a segmental gear member carried by the bearing bracket, a segmental gear member pivotally mounted on the first-named bracket and meshing with the other gear member, means for shifting the said base in a direction radially of the drum, and means for simultaneously rocking the second-named gear segment to effect rotative movement of the bearing bracket in either direction through an arcuate path of approximately 180°, ending at the inner periphery of the bead and at the outer periphery of the drum.

6. The combination with a rotatably-mounted tire-building drum for receiving fabric plies of a tire, of bead-wrapping mechanism comprising a peripherally-grooved roller whose axis normally extends in the same general direction as the axis of the drum, a movable base, a bracket mounted on the base, a bearing bracket tiltably mounted on the first-named bracket, for supporting the said tool, a segmental gear member carried by the bearing bracket, a segmental gear element pivotally mounted on the first-named bracket and meshing with the other gear member, means for shifting the said base in a direction radially of the drum, means for simultaneously rocking the second-named gear segment to effect rotative movement of the bearing bracket in either direction through an arcuate path of approximately 180°, ending at the inner periphery of the bead and at the outer periphery of the drum, and means for shifting the roller within its bearing bracket, to move it toward and away from bead-wrapping position.

7. The combination with a rotatably-mounted tire-building drum, for receiving fabric plies of a tire, of mechanism comprising a tool for wrapping the edges of the fabric around bead cores, a movable base, a bracket on said base, means for pivotally supporting the tool on the bracket, on an axis transverse to the axis of the drum, a rotatable shaft, a cam carried by the shaft, a cam follower cooperating with the said cam and having engagement with said base, arranged to effect movements of the base radially of the form during rotation of the shaft, a second cam on the shaft, a cam follower therefor, means actuated by said follower for tilting the tool on its bracket, about an axis transverse to the axis of the drum and through an arcuate path of 180°, ending at the inner periphery of the bead and at the outer periphery of the drum, and means for tilting the bracket to move the tool toward and from wrapping position.

8. The combination with a rotatably-mounted, approximately flat tire-building drum for receiving fabric plies of a tire, of mechanism comprising a tool for wrapping the edges of the fabric around a bead core, a support for the tool, and means for moving said support radially of the drum and for simultaneously tilting the tool on its support through an arcuate path of approximately 180° beginning at a point adjacent to the inner periphery of the core and terminating at the face of the drum, to wrap a layer of fabric around the core.

9. The combination with a rotatably-mounted, approximately flat tire-building drum for receiving fabric plies of a tire, of mechanism comprising a tool for wrapping the edges of the fabric around a bead core, means for continuously moving said tool through an arcuate path of approximately 180° beginning at a point adjacent to the inner periphery of the core and terminating at the face of the drum, to wrap a layer of fabric around the core, means for withdrawing the tool from fabric-wrapping position, and means for returning the tool to fabric-wrapping position, beginning at a point adjacent to the peripheral face of the drum and terminating at a point adjacent to the inner periphery of the bead core to wrap the edge of a subsequently-applied layer of fabric around the core.

10. The combination with a rotatably-mounted, approximately flat tire-building drum for receiving fabric plies of a tire, of mechanism comprising a tool for wrapping the edges of the fabric around a bead core, means for continuously moving said tool through an arcuate path of approximately 180°, beginning at a point adjacent to the inner periphery of the core and terminating at the face of the drum, to wrap a layer of fabric around the core, and means for yieldably maintaining uniform pressure against the tool during said movement.

11. Tire-building apparatus comprising a rotatably supported tire-building drum for receiving the fabric plies of a tire, with the edges of the fabric projecting axially beyond the sides of the drum, in position to receive bead cores of annular shape that are disposed peripherally of the fabric, a supporting member, a roller journalled in said member, a bracket on which the supporting member is pivotally mounted, on an axis transverse to the axis of the roller, means for supporting said bracket in position where the said supporting member is disposed alongside of the drum and with the axis of the roller extending in the same general direction as the drum, means for shifting the bracket radially of the drum in an outward direction, and means for simultaneously tilting the supporting member on its axis, in predetermined relation to said outward movement of the bracket, said tilting movement being continuous until the periphery of the roller engages the periphery of the drum.

12. Tire-building apparatus comprising a rotatably supported tire-building drum for receiving the fabric plies of a tire, with the edges of the fabric projecting axially beyond the sides of the drum, in position to receive bead cores of annular shape that are disposed peripherally of the fabric, a supporting member, a roller journalled in said member, a bracket on which the supporting member is pivotally mounted, on an axis transverse to the axis of the roller, means for supporting said bracket in position where the said supporting member is disposed alongside of the drum and with the axis of the roller extending in the same general direction as the drum, means for shifting the bracket radially of the drum in an outward direction, means for simultaneously tilting the supporting member on its axis, in predetermined relation to said outward movement of the bracket, said tilting movement being continuous until the periphery of the roller engages the periphery of the drum, and means for shifting the roller in a radial direction upon its supporting member.

13. Tire-building apparatus comprising a tire-building drum for receiving fabric plies of a tire with the edges of the fabric projecting axially beyond the sides of the drum, a supporting member, a roller journalled in said member, a bracket on which the supporting member is pivotally mounted, on an axis transverse to the axis of the roller and the axis of the drum, means for shifting the said bracket in a direction radially of the drum, for such distance that the roller can be moved from a position alongside of the drum to a position beyond the periphery of the drum, and means for simultaneously shifting the roller in a direction radially of itself, upon its supporting member, whereby it may be held in pressing engagement against fabric being wrapped around a bead at the edge of the drum, during shifting movement of said bracket.

EDWIN MILLER.